J. HREN & C. EISENLOHR.
MACHINE FOR MAKING PAPER BOX BLANKS.
APPLICATION FILED APR. 20, 1918.

1,293,782.

Patented Feb. 11, 1919.
10 SHEETS—SHEET 1.

Fig. 1.

INVENTORS
Joseph Hren &
Carl Eisenlohr
BY
Frank v. Briesen
ATTORNEY

J. HREN & C. EISENLOHR.
MACHINE FOR MAKING PAPER BOX BLANKS.
APPLICATION FILED APR. 20, 1918.

1,293,782.

Patented Feb. 11, 1919.
10 SHEETS—SHEET 3.

Fig. 3.

INVENTORS
Joseph Hren &
Carl Eisenlohr
BY
ATTORNEY

UNITED STATES PATENT OFFICE.

JOSEPH HREN, OF KINGSTON, NEW YORK, AND CARL EISENLOHR, OF NEWARK, NEW JERSEY.

MACHINE FOR MAKING PAPER-BOX BLANKS.

1,293,782.  Specification of Letters Patent.  Patented Feb. 11, 1919.

Application filed April 20, 1918. Serial No. 229,679.

*To all whom it may concern:*

Be it known that we, JOSEPH HREN and CARL EISENLOHR, both citizens of the United States, and residents, respectively, of Kingston, in the county of Ulster and State of New York, and Newark, in the county of Essex and State of New Jersey, have invented certain new and useful Improvements in Machines for Making Paper-Box Blanks, of which the following is a specification.

Paper box blanks for oblong or square boxes were heretofore generally formed of a unipartite cruciform piece of paper or card board, the central portion of which would go to form the box bottom, while the four wings would go to form the box sides. In cutting or stamping such a blank from a sheet, waste was liable to occur, inasmuch as the four squares left over from the sheet at the corners, between the wings, would form useless remnants. Our machine pertains to that class in which each blank is formed out of three sections, viz: one oblong main section that forms the bottom of the box, together with two end wings, and two additional supplemental sections that form the two side wings. The machine briefly stated, operates in such a manner that the three component parts of each blank are fed out of their magazines, in such a way that the supplemental sections become centered to the right and left of the main section, such supplemental sections being covered with an adhesive along their inner edges during their movement. The supplemental sections are then pushed laterally toward the main section, so that their glued inner rims will underlie the longitudinal edges of the main blank. A plunger then descends to force the superimposed rims together and thus attach the supplemental sections to the main section, after which the finished composite blank is ejected. The blank made by the machine is not only (owing to the elimination of waste) cheaper than similarly shaped blanks as heretofore made, but it is also adapted to form a stronger box inasmuch as the latter will be reinforced along two of its edges by doubled rim sections.

The invention consists in the various features of novelty all as more fully pointed out in the specification and appended claims.

Figure 23:
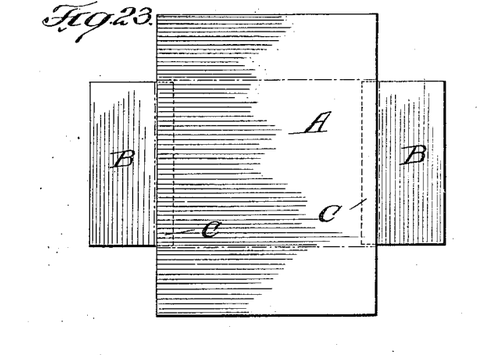
Fig. 23, a view of the finished product.

Referring briefly to Fig. 23, which shows the composite blank forming the product of the machine, A represents the main oblong section, and B the two shorter side sections or wings the glued rims C of which underlie and are pasted to blank A in such a manner that the top and bottom edges of the wings are set off from the corresponding edges of the main section, so that the desired cruciform contour is obtained, it being of course, obvious, that the blank is adapted to form box covers equally well as box bodies.

Figure 2:
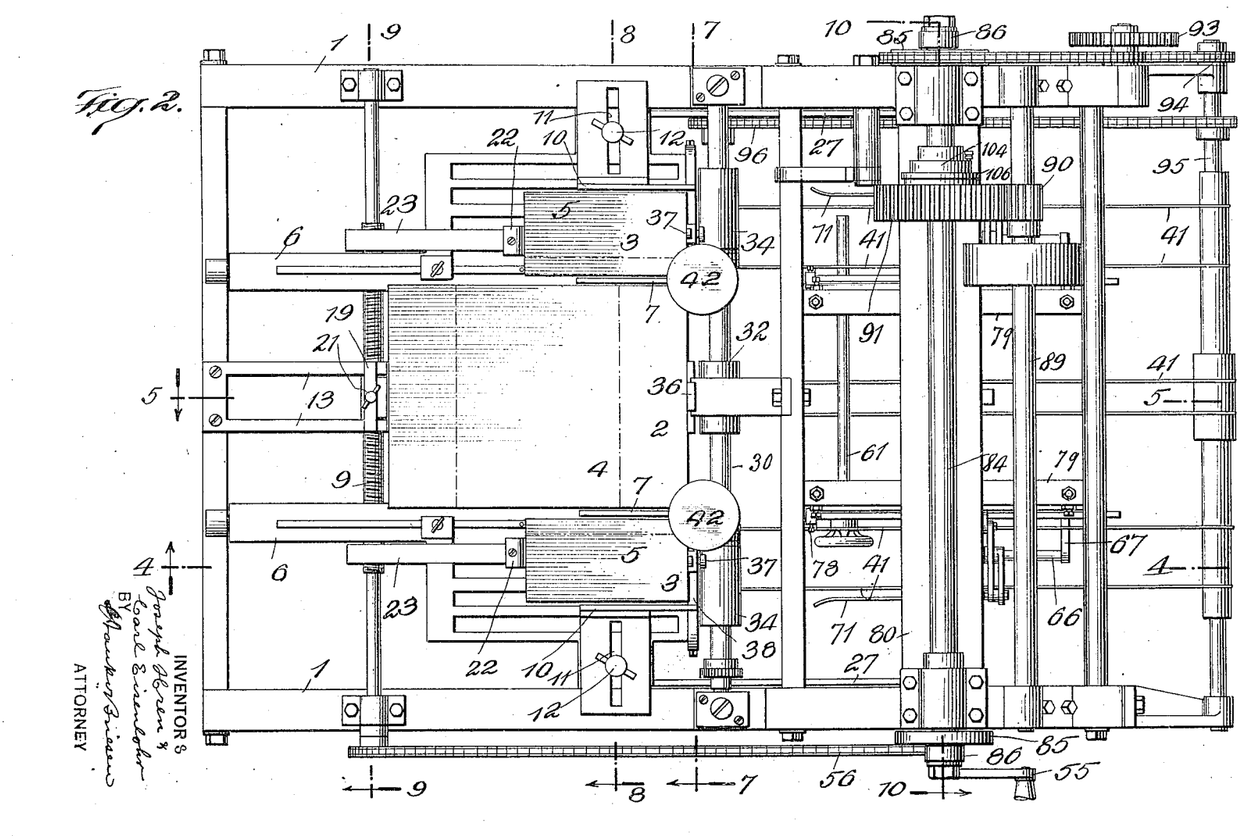
Fig. 2, a plan.

The machine frame 1 is provided at its receiving end with a central magazine 2, and two flanking magazines 3, adapted to hold respectively, stacks of larger paper sheets 4, to form the body and two opposed wings of the composite blank, and stacks of shorter sheets 5 to form the two other opposed wings of said blank. All three magazines are adjustable in width, so as to set the machine for wider or narrower blanks. In order to effect this result, the central magazine is formed by a pair of laterally movable rails 6 furnished at their front ends with upwardly extending longitudinally disposed plates or partitions 7. Rails 6 have depending threaded eyes 8 engaged by a right and left screw spindle 9 journaled in frame 1. This spindle may be rotated in manner hereinafter referred to, so as to thereby move rail 6, either toward or away from each other and thus diminish or increase the width of magazine 2 in the manner desired. The bottom of each magazine 3, is secured at its inner side to the corresponding rail 6 and is defined at its outer side by a bracketed plate or partition 10 (Fig. 2) the lower horizontal flange of which is provided with a slot 11 engaged by a clamp screw 12 that is tapped into the bottom of the magazine. By slackening this screw, partitions 10 may be manually shifted inward or outward, to diminish or increase the width of magazines 3.

Figure 3:
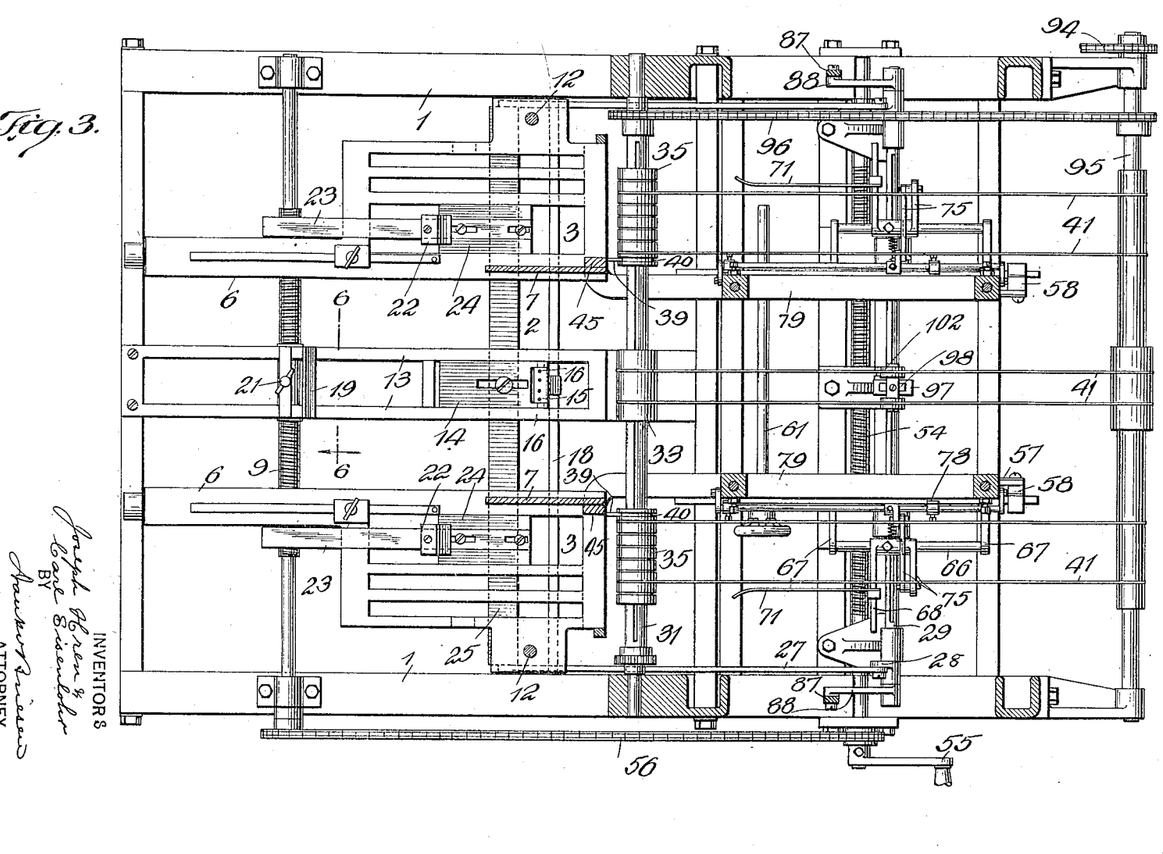
Fig. 3, a sectional plan on line 3—3 Fig. 1.
Figure 4:
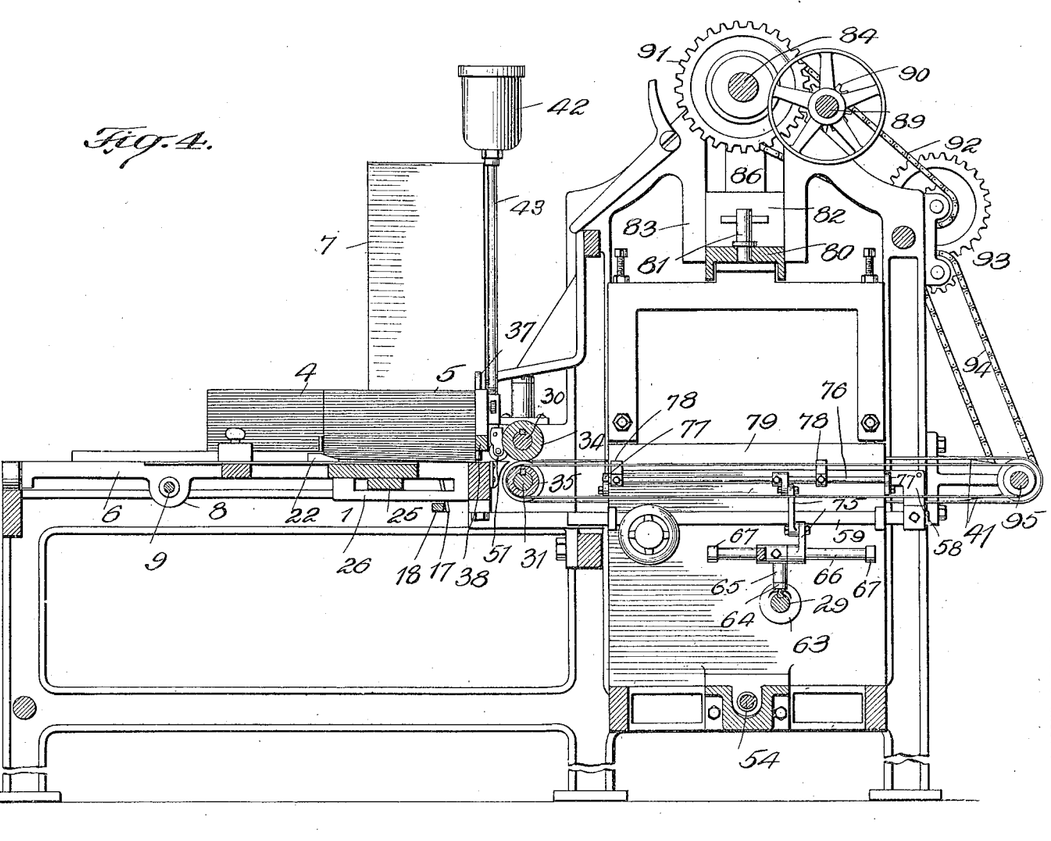
Fig. 4, a longitudinal section on line 4—4 Fig. 2.
Figures 5, 6:
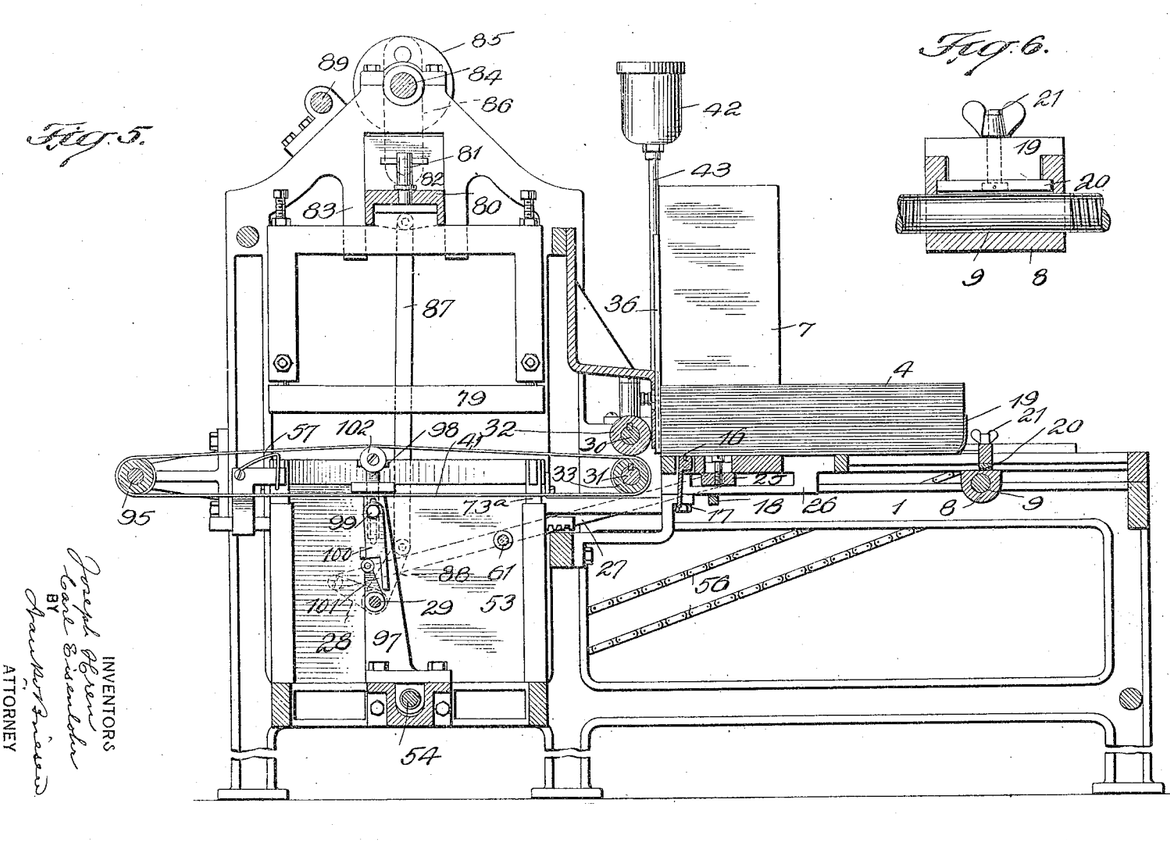
Fig. 5, a similar section on line 5—5 Fig. 2.
Fig. 6, a section on line 6—6 Fig. 3.
Figures 7, 8:
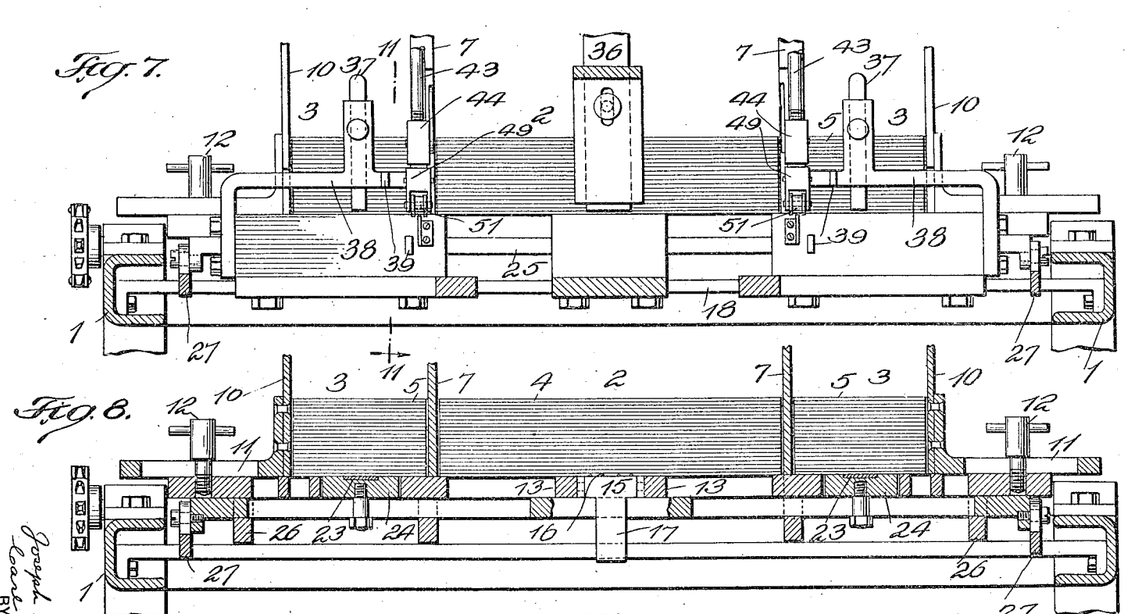
Fig. 7, a section on line 7—7 Fig. 2.
Fig. 8, a section on line 8—8 Fig. 2.
Figure 9:
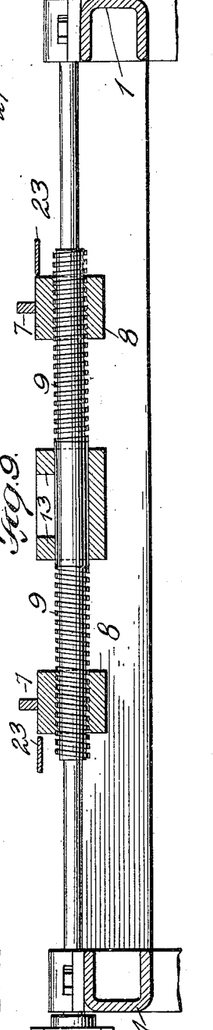
Fig. 9, a section on line 9—9 Fig. 2.

Along the center of magazine 2, there extends a pair of longitudinal guide rails 13 between which is free to move a feed slide 14. In this slide is journaled a rocker 15 (Figs. 3 and 5) carrying a plurality of pins or pricks 16. As slide 14 advances, rocker 15 is so positioned that pins 16, extend upwardly and engage the bottom of the lowermost sheet 4, near the forward edge thereof, so as to carry said sheet along. As the slide recedes, a dog 17 depending from rocker 15 will strike an abutment 18 of the machine frame, whereby the rocker will be so turned, that its pins will be tilted to clear the sheet. By this peculiar method of feeding the larger sheets, buckling of such sheets, that would be apt to occur, were the sheets fed from their heel, is prevented. On rails 13, is further supported a back gage 19 for magazine 2 (Figs. 5 and 6) said gage being adjustable along the rails by means of a cross piece 20, and clamp screw 21. Along the bottom of each of the magazines 3, is movable, a pusher 22 (Fig. 3) adapted to engage the heels of the smaller sheets 5. Each pusher is mounted on a longitudinally disposed rod 23, that is in turn secured to a slide 24. Slide 14 together with the two slides 24, are operatively engaged by a cross head 25 movable in guides 26 of the machine frame (Fig. 4). The cross head receives reciprocal motion by links 27 and cranks 28, from a rock shaft 29, hereinafter referred to, so that each to and fro movement of the cross head will cause a sheet to be fed simultaneously out of each of the three magazines.

In advance of all of the three magazines, there extends a pair of parallel transverse shafts 30 and 31 driven in manner hereinafter described. These shafts carry respectively opposite magazine 2, a pair of superimposed feed rolls 32 and 33, and opposite each of the magazines 3, a pair of similar feed rolls 34 and 35. The central magazine 2 is provided at its forward end with a vertically adjustable gage 36 (Fig. 5) which may be set to sheets of differenet thicknesses and has for its function to guide the lowermost sheet 4 to the pass of rolls 32, 33. Each of the side magazines 3, is likewise provided at its forward end with a vertically adjustable gage 37 (Fig. 4) that is adapted to guide the lowermost sheet 5 to the pass between rolls 34 and 35. This gage is carried by a cross bar 38, that is in turn secured at its inner end to the corresponding adjustable rail 6. Fingers 39 extending forwardly from magazines 3 and entering circumferential grooves 40 of rolls 34 and 35 cause the latter to be shifted along shafts 30 and 31 simultaneously with the shifting of rails 6 (the drawing Fig. 3 showing only the lower fingers) so that the rolls will remain centered within their magazines during all adjustments thereof. Shafts 30 and 31 are intergeared so as to turn in opposite directions and cause their rolls to draw the lowermost sheets out of the magazines and upon a number of endless feed tapes 41 passing over rolls 33 and 35 that are grooved for the reception of the tapes. The latter convey the sheets to the assembling and connecting means hereinafter referred to.

Before the smaller sheets 5 are withdrawn from their magazines, they are provided with a glue strip along their inner rims. The liquid glue or paste flows from pots 42 through tubes 43 provided at their lower ends with clamps 44 (Figs. 11–15). These clamps straddle the lower ends of posts 45 secured to the outer sides of partitions 7, along the front edges thereof, so that in this way, the glue is supplied to sheets 5 at the forward ends of magazines 3 as the sheets pass out of the magazines. Each tube 43 is vertically adjustable along its post 45 by means of a cam pin 46, engaging an elongated slot 47 of clamp 44, so as to set the glue applying means to sheets of different thicknesses.

To the lower squared end of tube 43, is fulcrumed at 48, a U-shaped box-bearing 49, that straddles the tube, and is normally held in vertical alinement therewith by a spring 50. In the lower end of bearing 49 is hung a glue applying roller 51 having a circumferential groove. That portion of squared tube 43 which extends into bearing 49 is beveled at its lower end, and is furnished with a nose 52 curved concentrically to roller 51, and entering normally the groove of the latter. When a sheet is fed forward within either of the magazines 3, it will by its engagement with roller 51 swing bearing 49 forward, so as to distance roller 51 from nose 52, and thus open up a duct through which the glue will flow upon the roller, to be carried by the latter along the inner rim of the paper sheet. As soon as this forward impulse ceases, the bearing will be returned to its normal position by spring 50, so that the duct is re-closed by nose 52.

Figure 10:
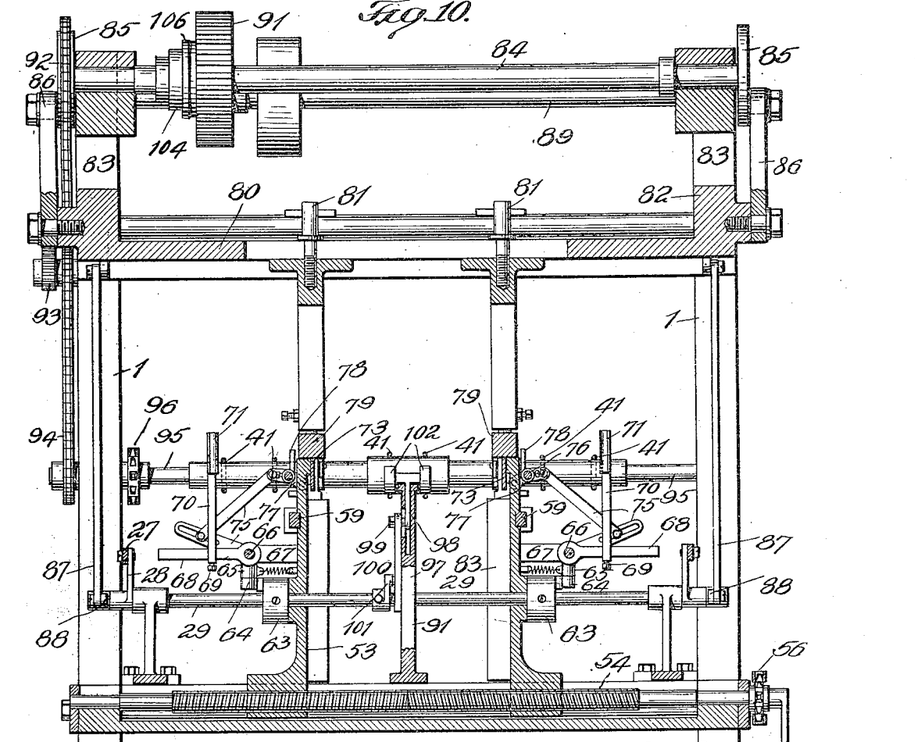
Fig. 10, a section on line 10—10 Fig. 2.
Figures 11, 12, 13, 14, 15:
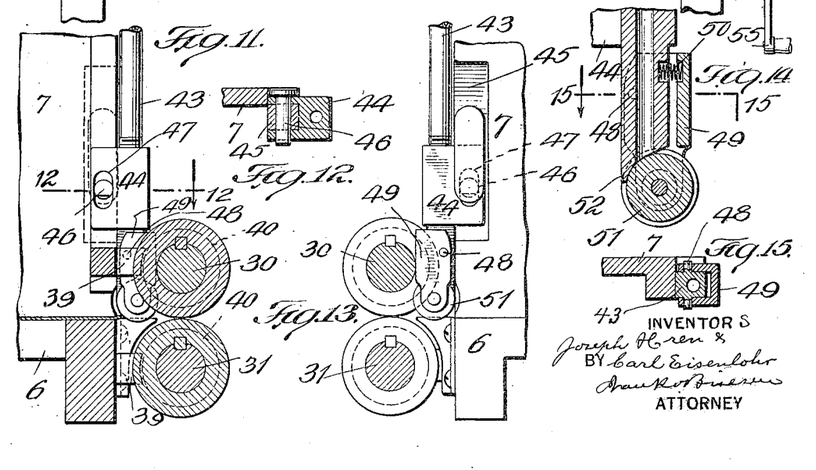
Fig. 11, a section on line 11—11 Fig. 7.
Fig. 12, a section on line 12—12 Fig. 11.
Fig. 13, an elevation of the adhesive applying means.
Fig. 14, a longitudinal section through the lower part thereof.
Fig. 15, a section on line 15—15 Fig. 14.
Figure 16:
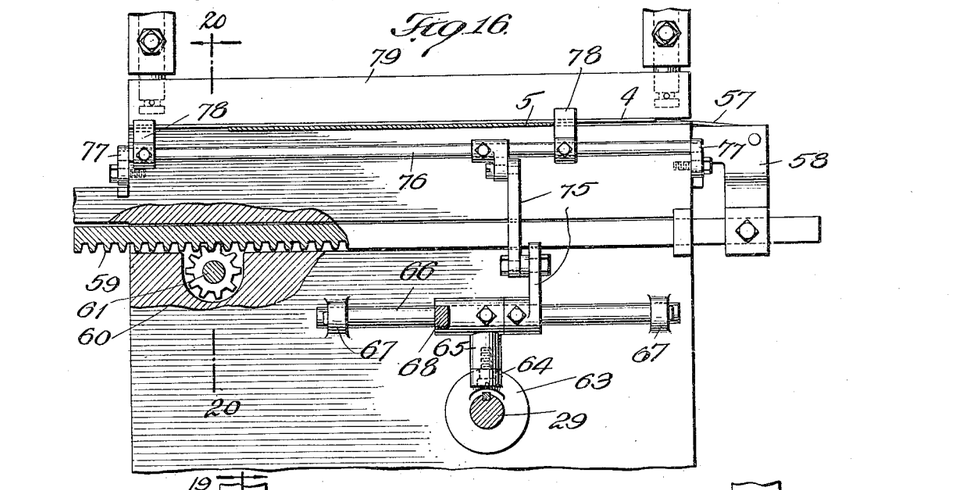
Fig. 16, a side elevation partly in section of one of the laterally operating pushers, and adjoining parts.
Figure 17:
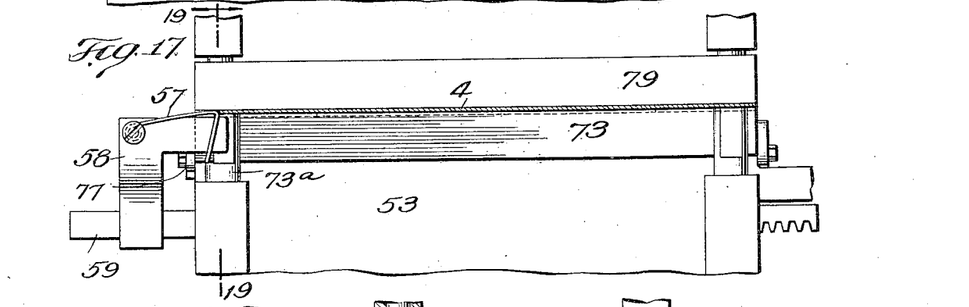
Fig. 17, a partial inner face view of the same.
Figure 18:
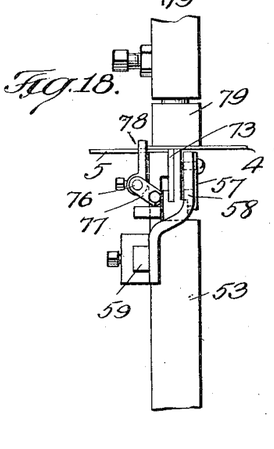
Fig. 18, a front end view thereof.
Figure 21:
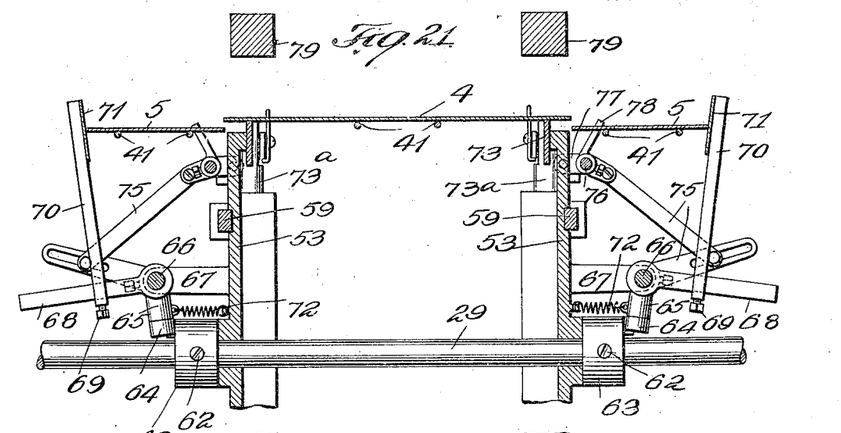
Fig. 21, an enlarged cross section through the pushers and adjoining parts, showing them in their retracted position.
Figure 22:
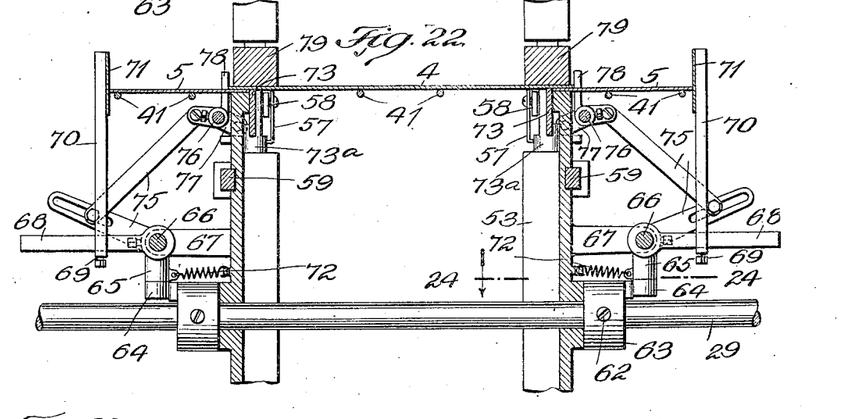
Fig. 22, a similar section, showing the pushers in their advanced position.

In advance of shafts 30, 31 there is supported upon the machine bed, a pair of parallel longitudinally disposed plates 53, that constitute the bed plates of a bipartite press (Figs. 21 and 22). These plates are provided with threaded eyes engaged by a right and left screw spindle 54 (Fig. 10) which may be turned by a handle 55 (Figs. 2 and 3) and is operatively connected by chain drive 56 with screw spindle 9. Plates 53 are alined longitudinally with rails 6 of central magazine 2, and by turning handle 55 said plates and rails are simultaneously moved inward or outward in such a manner as to always maintain said alinement. In other words, plates 53 will retain their position opposite the right and left ends of magazine 2, during all adjustments of the latter. After a sheet 4 has cleared rolls 32, 33, it is by tapes 41 carried upon bed plates 53, in such a way that the right and left longitudinal edges of said sheet are supported by the correspondingly located bed plates in manner hereinafter referred to. Means are provided for stopping the sheet, when it has arrived at the position desired. These means comprise spring stops or abutments 57 (Figs. 5 and 17) carried by brackets 58 which are mounted on racks 59 that are slidable along plates 53. The two racks 59 are engaged by pinions 60 mounted on a common transverse spindle 61 by the turning of which the stops may be set either inward or outward so as to check the movement of smaller or larger sheets (Fig. 16). When set inward, the stops may arrive in a position intermediate plates 53, in which position they are subjected to the action of the plunger hereinafter more fully referred to. This action will cause the stops to be forced down, while upon the cessation of pressure, they will rise owing to their resiliency, so as to oppose the advance of the succeeding sheet.

Means are provided for arresting the two flanking smaller sheets 5, which are fed out simultaneously with the intermediate larger sheet 4, after the smaller sheets have arrived at such a position as to be set back an equal distance from the front and rear edges of the larger sheet. Means are further provided for then pushing the two smaller sheets transversely toward the larger sheet, until the gummed rims of the former are made to underlie the longitudinal edges of the latter to the extent desired.

Figure 19:
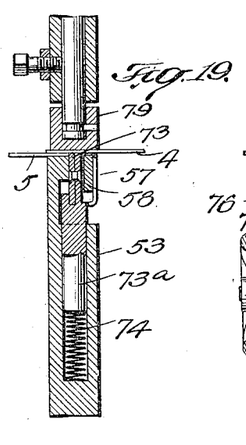
Fig. 19, a section on line 19—19 Fig. 17.
Figure 20:
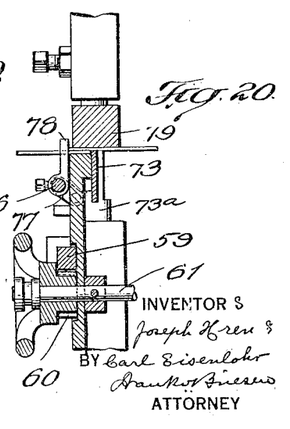
Fig. 20, a section on line 20—20 Fig. 16.
Figure 24:
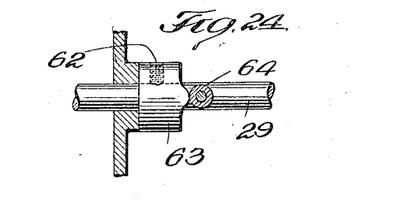
Fig. 24, a section on line 24—24 Fig. 22.
Figures 25, 26, 27, 28, 29:
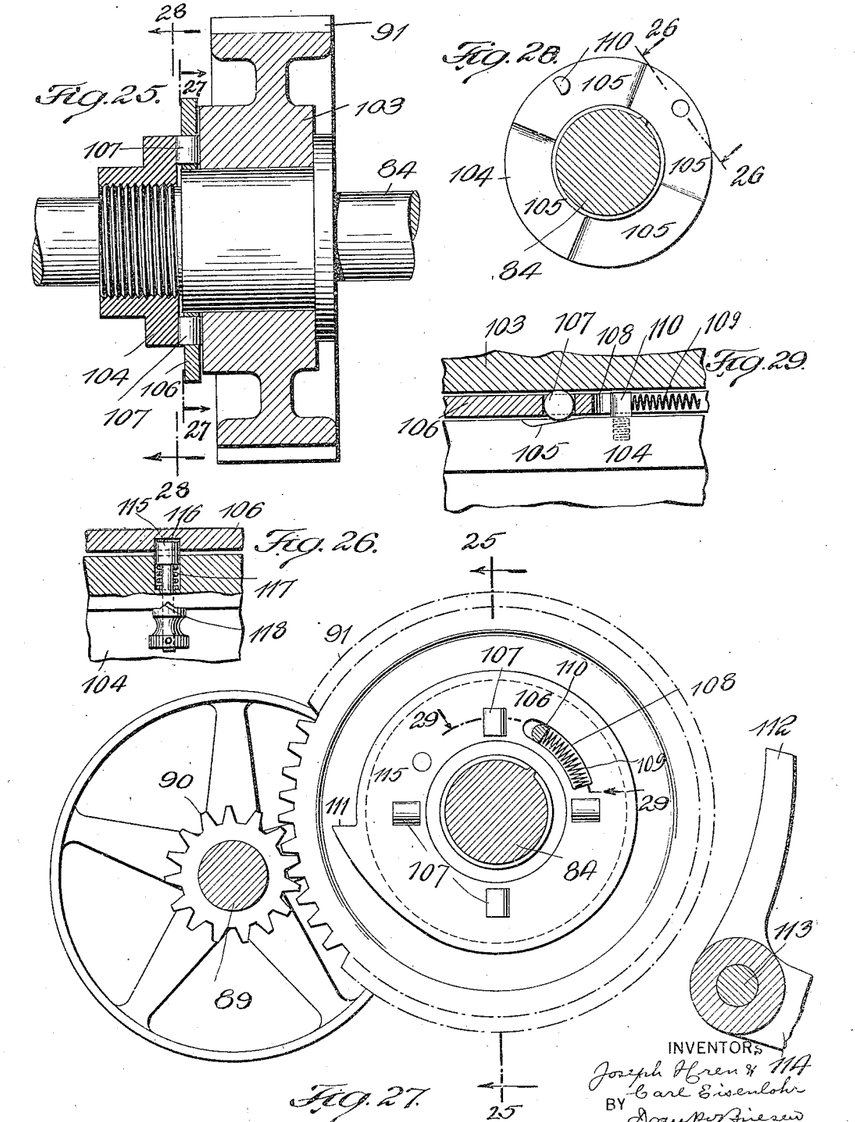
Fig. 25, an enlarged section of the clutch mechanism on line 25—25 Fig. 27.
Fig. 26, a section on line 26—26 Fig. 28.
Fig. 27, a section on line 27—27 Fig. 25.
Fig. 28, a section on line 28—28 Fig. 25.
Fig. 29, a section on line 29—29 Fig. 27.

These arresting and underlapping means are as follows:

On rock shaft 29 (Figs. 21, 22, 24) is mounted a cam 63 connected to the shaft by a groove and feather and a set screw 62 so that it is adjustable along the shaft together with its plate 53. Each cam engages a roller 64 journaled in a spring-influenced bearing block 65, that is mounted on a rock shaft 66, extending longitudinally along the outer side of plate 53, and hanging in bearings 67 of the latter. From block 65, extends outwardly a rod 68 upon which is adjustably mounted by set screw 69, an upwardly extending arm 70, to which is secured a springy longitudinally extending plate 71 constituting a pusher. As cam 63 tilts rod 68 upward, its pusher 71 will be swung inward at right angles to the machine axis and thus push sheet 5 with its inner longitudinal edge underneath the corresponding outer longitudinal edge of sheet 4 (Fig. 22). After this operation has been effected, cam 63 will swing rod 68 downward, so as to cause pusher 71 to be moved outward (Fig. 21) which movement is assisted by spring 72. In order to limit the inward movement of sheet 5, there extends along the inner edge of each bed plate 53, a longitudinally disposed rail 73 carried by a plunger 73ᵃ projecting into plate 53 (Fig. 19) the rail being by springs 74 normally raised a slight distance above the upper edge of the plate. The rails of the two plates 53 moreover, constitute a track that supports sheet 4, a short elevation above plates 53, and permits sheets 5 to be slid over the tops of such plates and underneath sheet 4, so as to obtain the overlap desired. Thus the rails assume the dual function of stops that check the overlap gradient of the sheets, and of depressible lifters for temporarily sustaining sheet 4 in a horizontal plane above that occupied by sheets 5.

The rock shaft 66 is connected by adjustable toggles 75, a second longitudinally disposed rock shaft 76 turning in links 77, of plate 53, and extending in proximity to the upper edge thereof. Upon each rock shaft 76 is adjustably mounted, a pair of stops 78 (Figs. 3, 21, 22) which upon their inward movement (occurring simultaneously with the inward movement of pushers 71) will engage the longitudinal edges of sheet 4 so as to center the latter. The front stops 78 should be set at the desired distance back of stops 57, so that sheets 5 are arrested as soon as they are centered alongside of sheet 4, or in other words, as soon as the transverse axes of sheets 5 coincide with the transverse axis of sheet 4. During the advance of sheets 5, they must override the rear stops 78, which for this purpose are made somewhat lower than the front stops.

After a pair of sheets 5 have been pushed with their gummed rims underneath sheet 4, in the manner described, the three sheets thus assembled are subjected to the action of a plunger that serves to permanently attach them to each other, and form the tripartite product desired. This plunger is composed of a pair of parallel longitudinally disposed bars 79 (Figs. 4 and 5) depending from a slotted cross head 80 to which they are adjustably connected by clamp screws 81, so that in this way, the two plunger plates may be set vertically above the respective bed plates 53 of the press. Head 80 is secured to a pair of slide blocks 82 movable in guides 83 and receiving vertically reciprocating movement from a counter shaft 84 by means of disks 85, and eccentrically pivoted links 86 (Fig. 1). Upon each descent of the plunger, it will first depress rails 73 together with the superimposed sheet 4 and then tightly press the latter against the gummed rims of sheets 5 that project over plates 53, so as to bind the overlapping seams of the three sheets and form the composite tripartite blank desired. Upon the ascent of the plunger, rails 73 will be again raised to their normal position by their springs 74, for the reception of the next sheet 4.

Figure 1:
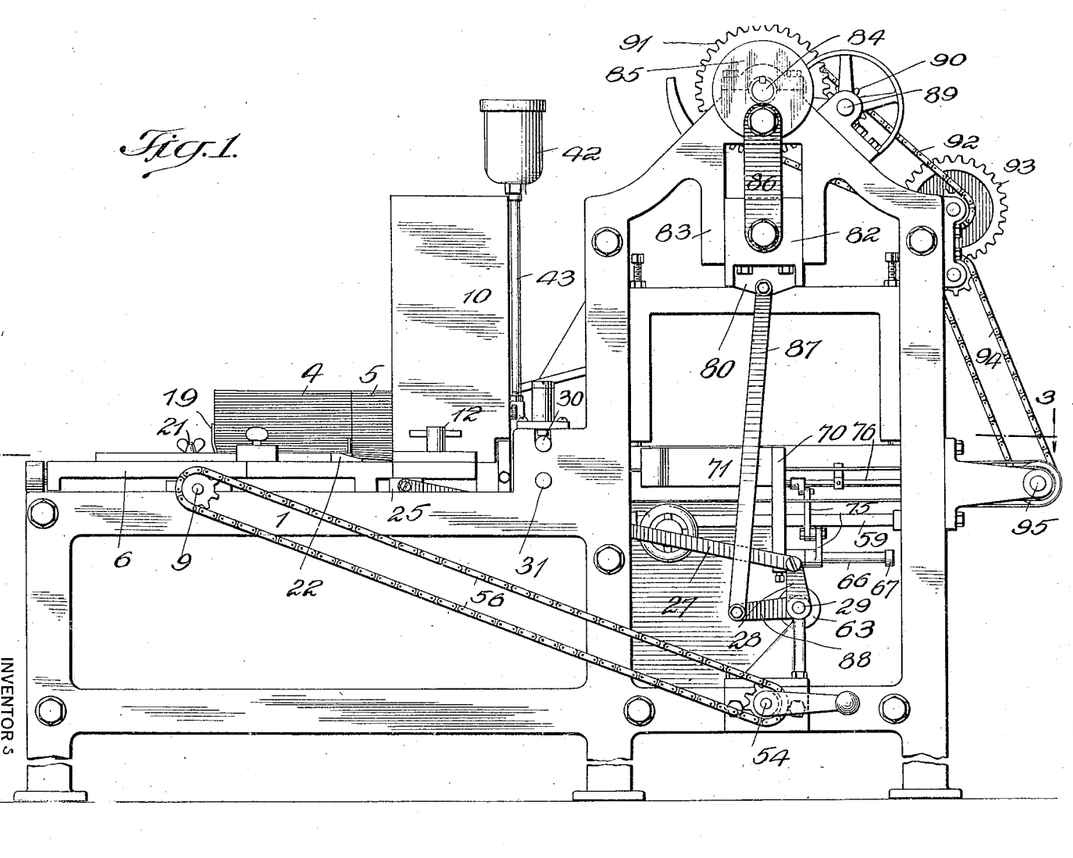
Figure 1 is a side elevation of a machine embodying our invention.

Cross head 80, by rods 87 and cranks 88 (Fig. 1) rocks shaft 29, that operates the cross head 25 actuating the feed slides 14, and 24, the timing being such that the slides advance while the plunger ascends and vice versa.

Countershaft 84 receives motion from a driving shaft 89 by a pinion 90 meshing into a clutch gear wheel 91 (Fig. 4). Shaft 89 rotates, by chain drive 92, accelerating gear 93 and chain drive 94, the front roller 95 of the feed tapes 41 which in turn by chain drive 96, rotates the rear shaft 31 thereof, the latter, as has been stated, being intergeared with shaft 30, so that the feed tapes and feed rolls are continuously operated.

Centered between plates 53, is a post 97 (Figs. 5 and 10) carrying a vertically movable slide 98. To this slide is fulcrumed at 99, a notched latch 100 which is adapted to be engaged by a dog 101 fast on rock shaft 29 and carrying a pair of rollers 102, the entire device constituting an ejector. Rollers 102 are alined with a pair of feed tapes 41 extending underneath sheet 4. When plunger 79 ascends, shaft 29 is so rotated that dog 101, will engage latch 100 and thus raise slide 98, to correspondingly raise tapes 41 together with the composite sheet. The latter may now be carried by the tapes over the tops of spring abutments 57, and thence over roller 95 and out of the machine.

The operation of the machine will be apparent from the foregoing description. The magazines, stops, bed plates, plunger plates, etc., are set to the length and width of the sheets to be united, the stops 57 for the center sheet 4 being set in advance of the front stops 78 of the two side sheets 5, a distance equal to one half the difference in length between said sheets.

The feed rolls on rotation of shaft 30, 31 will carry the sheets out of their magazines, sheets 5 during this movement being gummed along their inner rims. All the sheets will by the feed rolls be carried upon the feed tapes, that will in turn, move them forward until arrested by their stops. The center sheet 4 will thus become supported upon the rails 73 while sheets 5 will be arranged upon the tapes alongside of said rails. The pushers 71 will now move inward to bear against the outer longitudinal edges of sheets 5, which by this transverse movement are projected with their inner gummed rims upon bed plates 53 and underneath the overhanging edges of sheet 4, until arrested by rails 73. This movement of the pushers taking place simultaneously with an inwardly swinging movement of stops 78, will cause sheet 4 to be, and remain centered, while sheets 5 are shoved beneath the same. Plungers 79 now descend to depress rails 73, and bind the sheets together, at their overlying rims, the upper sides of plates 53 serving as counters. As the plungers rise, the ejector likewise rises, to lift the united sheets, and permit the feed tapes 41 to carry them over the tops of stops 57 and out of the machine, which completes the operation.

Figs. 25–29 illustrate the construction of the clutch carrying the gear 91, that serves to couple driving shaft 89 with counter shaft 84. Gear 91 is fast on a hub 103 normally loose on shaft 84. Opposite to this hub there is threaded upon shaft 84, a collar 104 having a plurality of beveled chambers 105.

Between hub 103 and collar 104 is interposed a disk 106 having a corresponding number of slots in which are housed friction rolls 107. Disk 106 is further provided with an arched slot 108, the wall of which is engaged by one end of a coiled spring 109, the other end of which engages a pin 110 of collar 104. This spring tends to so turn the latter, that rolls 107 are forced into the contracted portions of chambers 105, so that in this way, the rolls by bearing against disk 106, will force the latter into face wise contact with hub 103 and close the clutch.

Disk 106 is provided with a tooth 111, adapted to be engaged by a dog 112 pivoted to the machine frame at 113, and furnished with a hand lever 114.

When the dog is swung into the path of tooth 111, it will upon the rotation of shaft 84, eventually come into engagement with said tooth, so that during the further slight turning movement of the shaft, disk 106 will remain arrested, against action of spring 109. The disk will thus become so placed, relatively to collar 104, that the friction rolls 107 are made to face the expanded portions of chambers 105, and will consequently recede into said chambers and away from disk 106. The pressure of the latter against hub 103 will thus relax so that the clutch is opened, and shaft 84 will no longer participate in the rotation of the driving shaft. Through collar 104 passes a headed pin 115 passing likewise through an aperture of disk 106, and engaging a socket 116 of hub 103. The pin is normally projected into said socket by a spring 117 housed within disk 106, and when thus advanced will so lock the latter, that rolls 107 face the expanded portions of chambers 105 and thus maintain the clutch in its open position. When the pin is pulled out against action of spring 117, and is slightly turned to carry a nose 118, with which it is provided, against the face of collar 104, the pin will be withdrawn from socket 116 to again unlock disk 106. The latter will now be so turned by its spring 109 that rolls 107 are made to face the contracted portions of chambers 105, and the clutch will again be returned to its operative position. The object of the pin 115 is to render the clutch "fool proof", so that it may be thrown out of commission, and no thrust will be transmitted from the power shaft to shaft 84, even though the dog 112 is thrown into the path of the tooth 111.

We wish it to be understood that various changes may be made in the construction and operation of the machine without departing from the spirit of the invention, and that we do not desire to be limited to the particular embodiment illustrated and described.

We claim:

1. A machine for making paper box blanks, comprising a pair of spaced parallel bed plates, depressible means on said bed plates for supporting a central sheet, means for supporting a pair of supplemental sheets sidewise of said central sheet, and means for projecting said supplemental sheets sidewise under the edges of said central sheet.

2. A machine for making paper box blanks, comprising a pair of spaced parallel bed plates, a pair of depressible members adapted to project above the same, means intermediate the bed plates for feeding a main sheet upon said members, and means for projecting a pair of supplemental sheets sidewise underneath the main sheet and against said members.

3. A machine for making paper box blanks, comprising a pair of bed plates, a pair of depressible members carried thereby, means for feeding a main sheet upon said members, means for applying an adhesive to a pair of supplemental sheets, means for feeding said supplemental sheets alongside the main sheet, means for projecting the supplemental sheets sidewise partly beneath the main sheet to form a pair of seams, and a plunger adapted to lower the depressible members and press said seams against the bed plates.

4. In a machine for making paper box blanks, a pair of laterally movable rails forming an intermediate main magazine therebetween, means for laterally adjusting said rails, a pair of supplemental magazines secured at their inner ends to said rails, and adjustable brackets on the outer ends of the supplemental magazines.

5. In a machine for making paper box blanks, a pair of rails forming a main magazine therebetween, a pair of bed plates alined longitudinally with said rails, means for simultaneously adjusting said rails and bed plates, and a plunger coöperating with the bed plates.

6. In a machine for making paper box blanks, a pair of rails forming a main magazine therebetween, a right and left screw threaded into said rails, a pair of bed plates longitudinally alined with said rails, a second right and left screw threaded into said bed plates, and means for operatively connecting said screws.

7. In a machine for making paper box blanks, a magazine, a paste pot, a tube projecting from said pot into said magazine, said tube having a lower nose, a bearing pivoted to the tube, and a grooved roller journaled in said bearing and adapted to be engaged by said nose.

8. In a machine for making paper box blanks, a magazine, a paste pot, a tube projecting from said pot into said magazine, said tube being provided with a lower squared end and with a curved nose on said squared end, a pivoted spring-influenced box-bearing straddling the squared end of the tube, and a grooved roller journaled in said bearing and adapted to be engaged by said nose.

9. In a machine for making paper box blanks, a pair of parallel bed plates, a pair of racks slidable along said plates, a pair of stops carried by said racks, pinions engaging the racks, and a spindle engaging the pinions.

10. In a machine for making paper box blanks, a pair of parallel bed plates, a pair of members slidable along said plates, brackets carried by said members, and spring stops carried by the brackets.

11. In a machine for making paper box blanks, a pair of parallel longitudinally disposed bed plates, a pair of oscillatable members arranged sidewise of said plates, and a pair of longitudinally disposed pushers carried by said members.

12. In a machine for making paper box blanks, a pair of parallel bed plates, a pair of spring-influenced rails extending normally above the inner edges thereof, and means for simultaneously depressing said rails.

13. In a machine for making paper box blanks, a bed plate, a rail extending normally above the inner edge thereof and adapted to support a paper sheet, and a pusher facing said bed plate, and adapted to project an additional sheet against said rail underneath the first named sheet.

14. In a machine for making paper box blanks, a pair of parallel bed plates, a pair of spring-influenced rails extending normally above the inner edges thereof and adapted to support a paper sheet, a pair of pushers facing said bed plates and adapted to project additional paper sheets against said rails underneath the first named sheet, and means for depressing said rails.

15. In a machine for making paper box blanks, a bed plate, a pusher, a stop, and means for simultaneously moving said pusher and stop toward or away from said plate.

16. In a machine for making paper box blanks, a bed plate, a rail extending normally a distance above the same, means for depressing said rail, a pusher and a stop arranged sidewise of the bed plate, and means for moving said pusher and stop toward and away from said plate.

17. In a machine for making paper box blanks, a bed plate, a first rock shaft journaled thereto, a pusher operatively connected to said rock shaft, a second rock shaft likewise journaled to the bed plate, a stop carried by said second rock shaft, and means for simultaneously advancing or retracting said pusher and stop.

18. In a machine for making paper box blanks, a bed plate, a movable rail extending normally a distance above the same, means for depressing said rail, a pusher and a stop arranged sidewise of the rail, and means for simultaneously advancing or retracting said pusher and stop.

19. In a machine for making paper box blanks, a pair of parallel bed plates, means intermediate said plates for feeding a paper sheet upon the same, and a pair of parallel plunger bars adapted to operatively engage said plates.

20. In a machine for making paper box blanks, a pair of parallel bed plates, paper feeding means intermediate said plates, a pair of spring-influenced members extending normally above the rails, and a pair of parallel plunger bars adapted to depress said members and to operatively engage said plates.

21. In a machine for making paper box blanks, a post, a slide carried thereby, a latch pivoted to the slide, and a dog adapted to engage the latch.

22. In a machine for making paper box blanks, a post, a slide carried thereby, means for operating the slide, a roller journaled to the slide, and a feed tape adapted to be engaged by the roller.

23. In a machine for making paper box blanks, a post, a slide carried thereby, a roller journaled to the slide, a latch pivoted to the slide, a dog adapted to engage the latch, and a feed tape adapted to be engaged by the roller.

Signed at New York, N. Y., this 19th day of April, 1918.

JOSEPH HREN.
CARL EISENLOHR.

Copies of this patent may be obtained for five cents each, by addressing the "Commissioner of Patents, Washington, D. C."